(12) United States Patent
Chung et al.

(10) Patent No.: US 10,182,024 B1
(45) Date of Patent: Jan. 15, 2019

(54) REALLOCATING USERS IN CONTENT SHARING ENVIRONMENTS

(71) Applicant: Amazon Technologies, Inc., Seattle, WA (US)

(72) Inventors: Tan Shen Cliff Chung, Seattle, WA (US); Brian Ashley Garber, Seattle, WA (US); Samuel Scott Gigliotti, Seattle, WA (US); Thomas Werner Kuehnel, Seattle, WA (US); Pavneet Singh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 256 days.

(21) Appl. No.: 14/981,281

(22) Filed: Dec. 28, 2015

(51) Int. Cl.
*H04L 12/58* (2006.01)
*H04L 29/08* (2006.01)

(52) U.S. Cl.
CPC .............. *H04L 51/04* (2013.01); *H04L 51/10* (2013.01); *H04L 67/306* (2013.01)

(58) Field of Classification Search
CPC ........ H04L 51/04; H04L 51/10; H04L 67/306
See application file for complete search history.

(56) References Cited

U.S. PATENT DOCUMENTS

| | | | |
|---|---|---|---|
| 9,021,370 B1 * | 4/2015 | Carlson .............. | G06Q 30/0607 715/751 |
| 2002/0007396 A1 * | 1/2002 | Takakura ................ | H04W 4/08 709/205 |
| 2009/0228944 A1 * | 9/2009 | Bodlaender ......... | H04L 12/1827 725/110 |
| 2011/0282959 A1 * | 11/2011 | Anderson ............ | G06Q 10/107 709/206 |
| 2014/0108427 A1 * | 4/2014 | Spiegel .................. | G06Q 30/02 707/748 |

(Continued)

OTHER PUBLICATIONS

IPCOM000208083D, "Method and System for Filtering Chat Messages based on Topic", Jun. 22, 2011, IP.com.*

(Continued)

*Primary Examiner* — Brian J. Gillis
*Assistant Examiner* — Chhian (Amy) Ling
(74) *Attorney, Agent, or Firm* — Eversheds Sutherland (US) LLP

(57) ABSTRACT

Systems, methods, and computer-readable media are provided for dividing and merging online content sharing environments such as, for example, online chat rooms. An online content sharing environment may have a group of user profiles associated therewith, some subgroup of which may be exchanging message content within the online content sharing environment at any given time. If an amount of message data traffic being exchanged and/or a number of user profiles exchanging messages exceeds a corresponding threshold value, the online content sharing environment may be divided into two or more sub-environments. Respective sub-groups of user profiles may then be identified based on association criteria and associated with the various sub-environments. Conversely, multiple online content sharing environments may be merged into a single content sharing environment if a combined amount of message content being exchanged and/or a combined number of user profiles exchanging messages meets or falls below a corresponding threshold value.

20 Claims, 6 Drawing Sheets

(56) References Cited

U.S. PATENT DOCUMENTS

2014/0229866 A1* 8/2014 Gottlieb ............... H04L 65/403
715/758
2016/0234149 A1* 8/2016 Tsuda ..................... H04L 51/16

OTHER PUBLICATIONS

IP.com, "A Method and system to join a missed group chat", IPCOM000241529D, May 8, 2015, 5 Pages.*

Ng, "Multiple Streams in Online Conversations", Thesis of MS in Computer Science of the University of California, Davis, 2012, 42 Pages.*

* cited by examiner

US 10,182,024 B1

REALLOCATING USERS IN CONTENT SHARING ENVIRONMENTS

BACKGROUND

Online messaging services allow for communications among participants who are physically located at different places. The messages can include text, video, and/or audio data. One type of messaging service is a chat room that is used to share information via text with a group of other users. This describes technical solutions to improve existing messaging services, including chat rooms.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
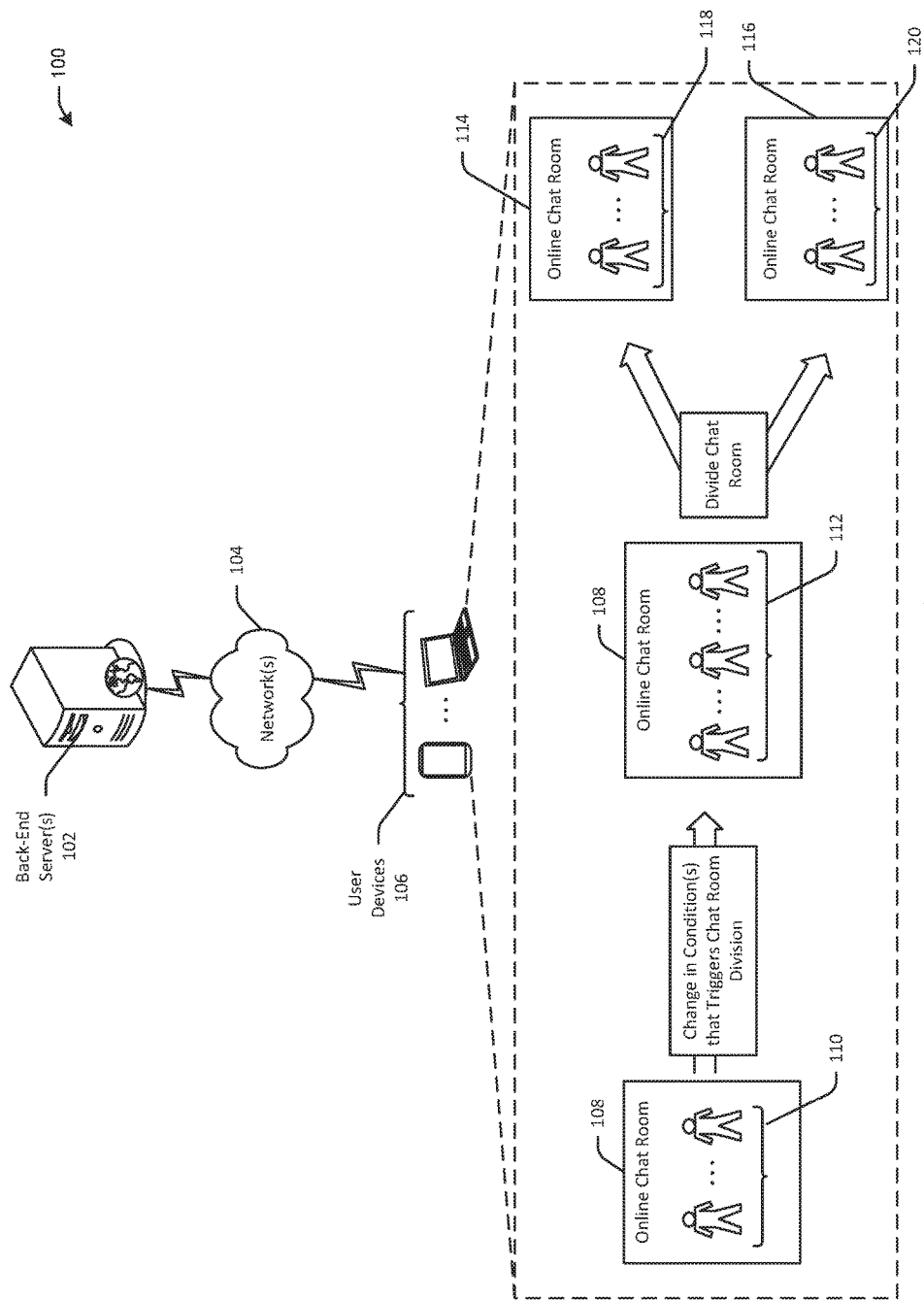
FIG. 1A depicts the dividing of an online content sharing environment into two or more sub-environments in accordance with one or more example embodiments of the disclosure.

This disclosure relates to, among other things, systems, methods, and computer-readable media for dividing and merging online content sharing environments such as, for example, online chat rooms. An online content sharing environment may have a group of user profiles associated therewith. Some subgroup of the group of user profiles may be exchanging message content within the online content sharing environment at any given time. If one or more conditions are met, the online content sharing environment may be divided into two or more sub-environments. Dividing a first online content sharing environment into, for example, two sub-environments may include partitioning a second online content sharing environment from the first online content sharing environment by disassociating a subgroup of user profiles from the first online content sharing environment and associating the subgroup of user profiles with the second online content sharing environment. Respective subgroups of user profiles may be identified and associated with the various sub-environments based on association criteria.

Conditions that trigger the dividing of an online content sharing environment may relate to, for example, the type/nature of the message content being shared (for example, exchanged, sent, published or delivered) in the content sharing environment, the amount of message data traffic being shared, an amount of available server or client-side infrastructure/bandwidth, or the like. For example, if message content relating to a new conversation topic is detected in the online content sharing environment, a new sub-environment may be formed and user profiles exchanging the message content relating to the new conversation topic may be disassociated from the original content sharing environment and associated instead with the new sub-environment. As another non-limiting example, if an amount of data associated with the message content being shared, a metric associated with the amount of message data traffic, and/or a number of user profiles exchanging message content in the online content sharing environment exceeds a corresponding threshold value, or is expected to exceed the threshold value at some future point in time, the online content sharing environment may be divided into two or more sub-environments. It should be appreciated that the term dividing or similar terms are used herein to describe the process by which multiple online content sharing environments are formed from an initial online content sharing environment by disassociating one or more subgroups of user profiles from the initial online content sharing environment and associating each such subgroup with a respective newly formed online content sharing environment.

Multiple online content sharing environments may also be merged into a single online content sharing environment if one or more conditions for merging content sharing environments are met. Similar to content sharing environment division, conditions that trigger the merging of multiple online content sharing environments may relate to, for example, the type/nature of the message content being shared in the content sharing environments, the amount of message data traffic being shared, an amount of available server or client-side infrastructure/bandwidth, or the like. For example, if first message content being shared among a first group of user profiles associated with a first online content sharing environment is directed to a same conversation topic as second message content being shared among a second group of user profiles associated with a second online content sharing environment, the first and second online content sharing environments may be merged by associating with the first group of user profiles and the second group of user profiles with a same online content sharing environment. As another non-limiting example, if a combined amount of data associated with message content shared within multiple content sharing environments, a metric associated with the combined message data traffic, and/or a combined number of user profiles exchanging message content meets or falls below a corresponding threshold value, or is expected to meet or fall below the threshold value at some point in the future, the multiple content sharing environments may be merged.

In an example embodiment, a group of user profiles may be associated with an online chat room. For example, each user profile in the group of user profiles may be authenticated with an online content sharing platform based on corresponding authentication credentials. Upon being authenticated, a user profile may be associated with an online chat room based on a user selection identifying the chat room. As another non-limiting example, a user profile may be automatically added to an online chat room based on a correspondence between metadata associated with the chat room and metadata associated with the user profile. For example, if a tag, keyword, or the like associated with a chat room matches a user preference associated with a user profile, the user profile may be automatically added to the chat room, or alternatively, the chat room may be recommended to the user profile. For example, a metadata tag that identifies a subject matter, topic, or the like being discussed in a chat room may be compared against user preference data associated with a user profile.

Some subgroup of user profiles of a group of user profiles associated with a chat room may be exchanging message content at any given time. The message content may include any combination of text content, video content, audio content, or the like. In certain example embodiments, video content may be presented within the chat room and user profiles may exchange electronic message text relating to the video content. The electronic message text may be exchanged in real-time with the presentation of the video content. The video content may include, for example, a live video game that user profiles associated with the chat room are participating in, streamed content including pre-recorded and/or live content, or the like. Further, the electronic message text may be contextually relevant to the video content. For example, a user profile may generate, and submit for distribution to other user profiles in the chat room, an electronic message that relates to an attribute of the video content such as, for example, a topic being discussed in the video content, an item being displayed, or the like. In addition, electronic messages exchanged in the chat room may be contextually relevant to one another. For example, a first message may be a question and a second message may be a response to the question.

In an example embodiment of the disclosure, an amount of message content being exchanged within a chat room may be determined. More specifically, an amount of data associated with electronic messages exchanged over some period of time may be determined. The amount of data associated with exchanged electronic messages may be compared to a threshold value, which may be representative of a threshold amount of data traffic per unit of time permitted for the chat room. The threshold value may be a predetermined value deemed to demarcate an acceptable user experience according to which message content can be reasonably consumed by user profiles participating in the chat room and a degraded user experience according to which message content cannot be reasonably consumed and instead becomes noise. In certain example embodiments, the threshold value may be dynamically modified based on the number of user profiles associated with the chat room and/or the number of user profiles actively exchanging message content.

If the amount of data associated with electronic messages being exchanged over some period of time fails to satisfy the corresponding threshold value, the online chat room may be divided into two or more online chat rooms. Depending on the implementation, a first value may fail to satisfy a second value if the first value meets or exceeds the second value, or alternatively, if the first value meets or is below the second value. If, for example, the amount of message data being exchanged over some period of time meets or exceeds the threshold amount of message data traffic permitted over that period of time, the online chat room may be divided into two or more chat rooms.

Respective subgroups of user profiles may then be identified and each such respective subgroup of user profiles may be associated with a corresponding chat room formed by dividing the original chat room. It should be appreciated that dividing a first chat room may include partitioning one or more additional chat rooms from the first chat room by disassociating one or more subgroups of user profiles from the first chat room and associating each such subgroup with a corresponding additional chat room. As such, in certain example embodiments, when a first chat room is divided into multiple chat rooms, an association between one or more user profiles and the first chat room may be maintained.

A subgroup of user profiles may be identified based on one or more shared attributes associated with each user profile in the subgroup, based on contextual relevance of messages generated by each user profile in the subgroup, or the like. For example, semantic language processing may be executed to determine that a first electronic message generated by a first user profile is a question and that a second electronic message generated a second user profile is a response to the question. In this example, the first user profile and the second user profile may be included in the same subgroup of user profiles based on the contextual relationship between the first and second electronic messages. As another non-limiting example, a first user profile and a second user profile may be included in a same subgroup of user profiles based on a determination that they share a common attribute. The common attribute may relate to product purchase history associated with the first and second user profiles, search or browsing history associated with the first and second user profiles, historical data indicative of subject matter associated with chat rooms that the first and second user profiles have previously participated in, and so forth.

For example, if it is determined that the first and second user profiles are each associated with respective purchase transactions of the same product, they may be included in the same subgroup. As another non-limiting example, if it is determined that the first and second user profiles each browsed or searched for the same product, provided the same or a similar search string to a search engine, or the like, they may be included in the same subgroup. As yet another non-limiting example, if it is determined that the first and second user profiles each previously participated in the same chat room or chat rooms directed to similar subject matter, they may be included in the same subgroup.

In other example embodiments of the disclosure, other association criteria may be used to determine subgroups of user profiles. For example, a number of electronic messages exchanged by user profiles may be assessed. Those user profiles that generate a number of messages or an amount of message data that satisfies a corresponding threshold value may be grouped into a same subgroup. As another non-limiting example, those user profiles that exchange messages within the original chat room (prior to division) that are topically related to one another may be grouped into the same subgroup. As still another non-limiting example, user profiles may be grouped into a same subgroup based on pre-existing social networking relationships. For example, if a first user profile is linked to a second user profile on a social networking platform, the first user profile and the second user profile may be grouped into a same subgroup.

In certain example embodiments, user profiles that do not share a common attribute may be grouped into a same subgroup. For example, historical purchase data, search/browsing data, historical chat room participation data, etc. may be evaluated to determine a first attribute associated with a first user profile and a second attribute associated with a second user profile. Each of the first and second attributes may relate to a subject matter of interest to the corresponding user profile, a respective product purchased as part of a corresponding purchase transaction associated with the corresponding user profile, or the like. If the first and second attributes are different from one another (e.g., a first subject matter of interest to the first user profile is different from a second subject matter of interest to the second user profile), the first and second user profiles may be grouped into the same subgroup. This may promote interaction between user profiles that may not typically interact of their own accord, and thus, may enhance the overall user experience.

In certain example embodiments, multiple online chat rooms may also be merged into a single larger chat room. The size of a chat room may refer to a number of user profiles associated with a chat room, a number of user profiles actively exchanging message content at any given time, or the like. A respective amount of message data exchanged between user profiles may be determined for each of multiple chat rooms over a period of time. A combined amount of message data being exchanged for the multiple chat rooms may then be determined. If the combined amount of message data satisfies a corresponding threshold value, then the multiple chat rooms may be merged into a single online chat room and the respective subgroup of user profiles associated with each of the of the smaller chat rooms may instead be associated with the larger merged chat room. For example, if the combined amount of message data meets or falls below a threshold amount of message data traffic per unit of time, the multiple chat rooms may be merged into the larger single chat room.

In certain example embodiments, other criteria may be assessed in addition to, or as an alternative to, the amount of message data being exchanged to determine whether to divide or merge chat rooms. For example, a number of user profiles, each of which generated at least a threshold number of electronic messages (which may be a single message) during a period of time, may be determined for a chat room. If the number of user profiles meets or exceeds a threshold value, the chat room may be divided into two or more smaller chat rooms. Conversely, a respective number of user profiles, each of which generated at least a threshold number of electronic messages during a period of time, may be determined for each of multiple chat rooms. If the combined number of such user profiles meets or falls below a corresponding threshold value, the multiple chat rooms may be merged into a single chat room. In other example embodiments, a total number of user profiles associated with a chat room (rather than just those user profiles exchanging messages) may be used to determine whether to merge or divide chat rooms.

In certain example embodiments, a message data traffic metric indicative of an amount of message data traffic in a chat room may be determined. The message data traffic metric may be an instantaneous value representative of an amount of message content that has been submitted to or presented in the chat room at a particular point in time. In other example embodiments, the message data traffic metric may be a moving average or other metric that is periodically calculated over time and that provides an indication of how message data traffic is changing over time. The message data traffic metric calculated for a chat room may be compared against a threshold value to determine whether the chat room should be divided into two or more smaller chat rooms. In addition, a combined message data traffic metric may be calculated for multiple chat rooms to determine whether the multiple chat rooms should be merged. Utilizing a message data traffic metric that provides a measure of message data traffic over a period of time rather than an instantaneous measure of message data traffic to determine whether to divide or merge chat rooms may avoid excessive oscillation between the dividing and merging of chat rooms.

In certain example embodiments, a chat room may be divided into multiple smaller chat rooms or multiple chat rooms may be merged into a single merged chat room based on contextual relevance of messages that are exchanged. For example, messages exchanged between users in a chat room may relate to multiple different topics. A conversation may become difficult to follow for certain user profiles that are responding to a particular topic if messages relating to one or more other topics are also being exchanged. Accordingly, in certain example embodiments, a chat room may be divided into multiple chat rooms, each of which corresponds to a particular topic being discussed in the original chat room. Natural language processing may be executed to determine the semantic context of messages exchanged, and when messages relating to a new topic are detected, a chat room relating to that topic may be formed off of the original chat room. As additional messages are received, natural language processing may be executed on these additional messages to determine which previously exchanged messages they share a contextual relevance with (e.g., the topic to which they relate), and thus, the appropriate chat room with which to associate the user profiles that generated the additional messages. In certain example embodiments, a time of receipt of an additional message may be used to determine a message to which the additional message corresponds, and thus, the appropriate chat room with which to associate the user profile that generated the additional message.

As previously mentioned, in certain example embodiments, a chat room may be divided into multiple smaller chat rooms or multiple chat rooms may be merged into a single larger chat room in anticipation of an increase or decrease, respectively, in message data traffic that is exchanged. For example, if video content is being presented in a chat room simultaneously with the exchange of electronic messages relating to the video content, a chat room may be divided prior to a particular segment of the video content being presented, where the segment is known or expected to generate a high volume of message data traffic based on, for example, historical message data exchanged in connection with the video content or similar video content. Conversely, multiple chat rooms may be merged in anticipation of a segment of video content being presented that is known or expected to generate a low volume of message data traffic. As another non-limiting example, an expected decrease in server-side infrastructure (e.g., a number of servers capable of processing electronic messages that are exchanged), and the resultant expected decrease in server-side bandwidth, may cause a chat room to be divided into multiple smaller chat rooms that can be managed more effectively by the reduced bandwidth. Conversely, an expected increase in server-side infrastructure may cause chat rooms to be merged.

In certain example embodiments, message content may be filtered prior to determining whether to merge or divide chat rooms. For example, message content received over a period of time may be filtered to exclude an electronic message generated from a first user profile from being sent to other user profiles participating in a chat room. The amount of data associated with the filtered message content may then be compared to a corresponding threshold amount of message data traffic permitted over the period of time to determine whether the chat room should be divided. If the filtered message content meets or exceeds the threshold amount of permitted message data, the chat room may be divided into multiple smaller chat rooms, as previously described. Conversely, if combined filtered message content associated with multiple chat rooms meets or falls below a threshold amount of permitted message data, the multiple chat rooms may be merged into a single larger chat room. It should be appreciated that message content may also be filtered subsequent to a determination to divide a chat room or merge multiple chat rooms.

In certain example embodiments of the disclosure, message content may be filtered based on one or more filtering criteria. For example, if a message includes a word or phrase that matches a predetermined set of words or phrases flagged as inappropriate, the message may be filtered out. As another non-limiting example, semantic language processing may be performed on an electronic message (potentially with respect to one or more other electronic messages) to determine whether the message should be filtered. For example, if the semantic language processing indicates that the message is a declarative statement that merely reinforces a statement made as part of another message, the message may be filtered. Alternatively, if an electronic message is determined to be a question, the message may be retained. In other example embodiments, the size of an electronic message may determine whether the message is retained or filtered out. For example, if a number of characters in the message meets or exceeds a first threshold value (e.g., is too long) or meets or falls below a second threshold value (e.g., is too short), the message may be filtered out.

In still other example embodiments, a contextual relevance of a message may dictate whether the message is filtered out or retained. For example, semantic language processing may be executed to determine whether a first message is contextually relevant to one or more additional messages. If the first message is determined to be contextually relevant to a threshold number of additional messages, the first message may be retained, and if not, the first message may be filtered out. As another non-limiting example, a contextual relevance of a message may be determined with respect to video content being presented in an online chat room. For example, the video content may be manually annotated to identify a set of keywords representative of items depicted in the video content, subject matter discussed in the video content, etc. Alternatively, speech recognition processing may be executed to generate a transcript of audio data associated with the video content. The set of keywords may then be identified from the transcript of the audio data. An electronic message may then be evaluated to determine whether it contains a keyword that matches a keyword in the set of predetermined keywords. If a match is detected, the message may be retained. On the other hand, if no match is detected, the message may be discarded (e.g., filtered out).

In certain example embodiments, the video content may be associated with one or more products, and a chat room may be divided in multiple smaller chat rooms based on the message content in the chat room that is related to the one or more products. For instance, if the video includes a shirt and matching pants, the message content may be used to split the chat room into two chat rooms, one including those talking about the shirt and the other with those talking about the pants. The video, in illustrative examples, may be a shopping channel or show, or a product review channel or show, or merely produced content that includes product placements. Such video may be time stamped or tagged with a product identifier that identifies the product during the period of the video that the product is displayed, discussed or highlighted, or alternatively, product identifiers may be included in metadata associated with the video. As an example, the product identifier may include or be associated with a universal product code (UPC), Amazon Standard Identification number (ASIN), or International Standard Book Number (ISBN). For each product identifier associated with a product, key words associated with that product and/or its identifier may be used in matching or filtering the message content to divide or split a chat room into multiple smaller chat rooms. For example, a ranking of the number of times a key word is identified in the messages may be used in making the split. For instance, the determination to make a split and/or the determination of the products about which the split may occur. In another example, a threshold number of key word appearances in the messages may be used to determine when to make a split and/or the product(s) around which the split of the chat room may occur. Such matching or filtering of the message content using the key works may be temporal so the key words matched or filtered on correspond in time to the products being displayed, discussed or highlighted in the video. For example, the product identifiers associated with the video portion being played (for example, streamed) may be identified and used to determine key words associated with the product. Those key words may be used to identify matches in the content of the messages in a chat room viewing the video. Those matches may be ranked or applied against a threshold to determine if a split should occur and/or along what products, as there may be multiple products identified in the metadata for the video and/or tagged or time stamped for that portion of the video.

In certain example embodiments, message content may be filtered after determining that a chat room is to be divided into multiple smaller chat rooms. For example, if an amount of data associated with message content exchanged over a period of time exceeds a threshold amount of permitted data traffic for the period of time, the message content may be filtered to determine whether an amount of data associated with the filtered message content falls below the threshold amount of permitted traffic. If the amount of data associated with the filtered message content falls below the threshold, the original chat room may be maintained and not divided into smaller chat rooms.

In certain example embodiments, message content may be filtered based on a user profile's message history. A message history associated with a user profile may include data indicative of historical messages generated by the user profile. For example, message content generated by a particular user profile may be filtered based on that user profile's message history. As another non-limiting example, message content generated by a first user profile may be filtered based on a respective message history associated with one or more other user profiles. For example, if the message history associated with a first user profile indicates that the first user profile historically generated over some period of time less than a threshold number of messages including profanity, then message content generated by other user profiles in the chat room may be filtered to exclude messages that include profanity. Conversely, if the message history associated with a first user profile indicates that the first user profile historically generated over some period of time more than a threshold number of messages including profanity, then message content generated by other user profiles may not be filtered for profanity. This type of filtering may be extended to other semantic contexts. For example, message content may be filtered based on tone (e.g., sarcasm), grammar, typing style (e.g., use of shorthand such as "u" for "you"), or the like. In this manner, messages generated by multiple different user profiles in a chat room are more likely to resemble one another in tone, style, or the like, thereby potentially providing a more engaging user experience. It should be appreciated that, in certain example embodiments, a decision as to whether to filter or not filter message content may be based on message histories associated with an aggregate number of user profiles. For example, message content may only be filtered to exclude profanity if a threshold number of user profiles in the chat room are associated with corresponding message histories that indicate less than a threshold historical number of messages generated that include profanity.

Further, in certain example embodiments, metadata may be generated and associated with a user profile based on the user profile's message history. The metadata may include data indicative of one or more attributes/characteristics of the user profile that identify the contextual relevance, importance, technical accuracy, or the like of content that the user profile can be expected to generate. For example, in a large chat room dedicated to a medical topic, a user profile associated with a physician may be assumed to generate more relevant and technically accurate message content than a user profile that is not associated with a medical professional. In such an example, a metadata tag "doctor" or the like may be associated with the user profile of the physician. The metadata tag may be displayed to other user profiles in the chat room to provide an indication of the potential greater relevance or technical accuracy of the message content generated by the user profile with which the metadata tag is associated. Further, in certain example embodiments, natural language processing may be executed on message content generated by a particular user profile to determine a weight to assign to the user profile. The weight may be indicative of a value (e.g., relevance, importance, technical accuracy, etc.) of the content. In certain example embodiments, the weight may be impacted by the number of messages that are generated in response to a particular message or group of messages generated by a user profile. For example, the more responses that are generated in response to a particular message or group of messages generated by a user profile, the greater the weight that may be assigned to the user profile. In certain example embodiments, if the weight meets or exceeds a threshold value, a metadata tag (e.g., "expert," "helpful," etc.) may be associated with the user profile. The metadata tag may indicate a heightened degree of value associated with message content generated by the user profile.

Example embodiments of the disclosure provide a number of technical features, technical effects, and improvements to technology. For example, example embodiments of the disclosure provide technological improvements to existing online content sharing environments by providing a mechanism by which such content sharing environments can be divided into smaller environments or merged into larger environments based on one or more events occurring such as, for example, the amount of message traffic being exchanged meeting or exceeding a threshold value, a message data traffic metric indicative of an amount of message traffic exchanged over time meeting or exceeding a threshold value, a change in client or server-side infrastructure/bandwidth, characteristics of the message content being exchanged meeting certain criteria, characteristics of other content (e.g., video content) being presented in a content sharing environment meeting certain criteria, a number of user profiles associated with a content sharing environment meeting or exceeding a threshold number, a number of user profiles actively exchanging messages over some period of time meeting or exceeding a threshold number, and so forth. This produces the technical effect of managing the size of a content sharing environment to allow more user profiles to exchange message content—thereby enhancing the user experience—while at the same time ensuring that the number of user profiles exchanging messages and/or the amount of message traffic being exchanged are within acceptable thresholds so as not to degrade the user experience. It should be appreciated that the above examples of technical features, technical effects, and improvements to technology of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Embodiments

FIG. 1A depicts the dividing of an online content sharing environment into two or more sub-environments in accordance with one or more example embodiments of the disclosure. A networked architecture 100 is depicted in FIG. 1A. The networked architecture 100 may include one or more back-end servers 102 and multiple user devices 106 communicatively coupled via one or more networks 104. While the back-end server(s) 102 may be described herein in the singular, it should be appreciated that multiple back-end servers 102 may be provided. The user devices 106 may include any suitable user device configured to execute a client application, which is, in turn, configured to interact with a server application executing on the back-end server 102. The user devices 106 may include, but are not limited to, a smartphone, a tablet, a personal digital assistant, a desktop computer, a laptop computer, a wearable computing device, a gaming console, a content streaming device, or the like. In certain example embodiments, the client application may be a traditional or mobile web browser that may be used to access a web-based server application associated with a content sharing platform via which electronic text-based messages, video content, audio content, or the like may be shared as part of content sharing environments (e.g., online chat rooms). In other example embodiments, the client application may be a thick-client application that provides access to the content sharing platform.

The network(s) 104 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 104 may have any suitable communication range associated therewith and may include, for example, global networks (e.g., the Internet), metropolitan area networks (MANs), wide area networks (WANs), local area networks (LANs), or personal area networks (PANs). In addition, the network(s) 104 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an example embodiment, each user device 106 may be utilized by a corresponding user to access a respective instance of a client application executable on the user device 106. For example, a user may utilize a user device 106 to log into, via the client application, a user profile associated with a content sharing platform. The user may provide authentication credentials (e.g., a username and password) to log into the corresponding user profile.

In an example embodiment, a group of user profiles 110 may be associated with an online chat room 108. Upon being authenticated as described earlier, a user profile may be associated with the online chat room 108 based on a user selection identifying the chat room 108. As another non-limiting example, a user profile may be automatically added to the online chat room 108 based on a correspondence between metadata associated with the chat room 108 and metadata associated with the user profile. For example, if a tag, keyword, or the like associated with the chat room 108 matches a user preference associated with a user profile, the user profile may be automatically added to the chat room 108, or alternatively, the chat room 108 may be recommended to the user profile. For example, a metadata tag that identifies a subject matter, topic, or the like being discussed in the chat room 108 may be compared against user preference data associated with a user profile.

Some subgroup of user profiles of the group of user profiles 110 associated with the chat room 108 may be exchanging message content at any given time. The message content may include any combination of text content, video content, audio content, or the like. In certain example embodiments, video content may be presented within the chat room 108 and user profiles may exchange electronic message text relating to the video content. The electronic message text may be exchanged in real-time with the presentation of the video content. Further, the electronic message text may be contextually relevant to the video content. For example, a user profile may generate, and submit for distribution to other user profiles in the chat room 108, an electronic message that relates to an attribute of the video content such as, for example, a topic being discussed in the video content, an item being displayed, or the like. In addition, electronic messages exchanged in the chat room 108 may be contextually relevant to one another. For example, a first message may be a question and a second message may be a response to the question.

In an example embodiment of the disclosure, an amount of message content being exchanged within the chat room 108 may be determined. More specifically, an amount of data associated with electronic messages exchanged over a first period of time may be determined. The amount of message data exchanged over the first period of time may represent an increase in message data traffic over a prior second period of time. The amount of data associated with electronic messages exchanged over the first period of time may be compared to a threshold value, which may be representative of a threshold amount of data traffic per unit of time permitted for the chat room 108. If the amount of data associated with electronic messages being exchanged over the first period of time fails to satisfy the corresponding threshold value, the online chat room 108 may be divided into two or more online chat rooms. For example, the chat room 108 may be divided into the chat room 114 and the chat room 116.

Respective subgroups of user profiles may then be identified and each such respective subgroup of user profiles may be associated with a corresponding chat room formed by dividing the original chat room 108. For example, a first subgroup of user profiles 118 may be identified and associated with the chat room 114 and a second subgroup of user profiles 120 may be identified and associated with the chat room 116. It should be appreciated that one of the chat rooms 114, 116 may actually correspond to the chat room 108 with a reduced size. In particular, dividing the chat room 108 into the chat rooms 114, 116 may correspond to disassociating one of the subgroups of user profiles 118, 120 from the chat room 108 and instead associating such subgroup with a newly formed chat room (114 or 116) while retaining the association of the other subgroup of user profiles with the chat room 108.

Each subgroup of user profiles 118, 120 may be identified based on one or more shared attributes associated with each user profile in the subgroup, based on contextual relevance of messages generated by each user profile in the subgroup, or the like. For example, semantic language processing may be executed to determine that a first electronic message generated by a first user profile is a question and that a second electronic message generated by a second user profile is a response to the question. In this example, the first user profile and the second user profile may be included in the same subgroup of user profiles (e.g., the subgroup 118) based on the contextual relationship between the first and second electronic messages. As another non-limiting example, a first user profile and a second user profile may be included in a same subgroup of user profiles based on determining that they share a common attribute. The common attribute may relate to product purchase history associated with the first and second user profiles, search or browsing history associated with the first and second user profiles, historical data indicative of subject matter associated with chat rooms that the first and second user profiles have previously participated in, and so forth.

For example, if it is determined that the first and second user profiles are each associated with respective purchase transactions of the same product, they may be included in the same subgroup. As another non-limiting example, if it is determined that the first and second user profiles each browsed or searched for the same product, submitted the same or a similar search string to a search engine, or the like, they may be included in the same subgroup. As yet another non-limiting example, if it is determined that the first and second user profiles each previously participated in the same chat room or chat rooms directed to similar subject matter, they may be included in the same subgroup.

In other example embodiments of the disclosure, other association criteria may be used to determine the subgroups of user profiles 118, 120. For example, a number of electronic messages exchanged by user profiles may be assessed. Those user profiles that generate a number of messages or an amount of message data that satisfies a corresponding threshold value may be grouped into a same subgroup. As another non-limiting example, those user profiles that exchange messages within the original chat room 108 that are topically related to one another may be grouped into the same subgroup. As still another non-limiting example, user profiles may be grouped into a same subgroup based on pre-existing social networking relationships. For example, if a first user profile is linked to a second user profile on a social networking platform, the first user profile and the second user profile may be grouped into a same subgroup.

In certain example embodiments, user profiles that do not share a common attribute may be grouped into a same subgroup. For example, historical purchase data, search/browsing data, chat room participation data, etc. may be evaluated to determine a first attribute associated with a first user profile and a second attribute associated with a second user profile. Each of the first and second attributes may relate to a subject matter of interest to the corresponding user profile, a respective product purchased as part of a purchase transaction associated with the corresponding user profile, or the like. If the first and second attributes are different from one another (e.g., a first subject matter of interest to the first user profile is different from a second subject matter of interest to the second user profile), the first and second user profiles may be grouped into the same subgroup. This may promote interaction between user profiles that may not typically interact of their own accord, and thus, may enhance the overall user experience.

In certain example embodiments, other criteria may be assessed in addition to, or as an alternative to, the amount of message data being exchanged to determine whether to divide the chat room 108. For example, a number of user profiles, each of which generated at least a threshold number of electronic messages (which may be a single message) during the first period of time, may be determined for the chat room 108. If the number of user profiles meets or exceeds a threshold value, the chat room 108 may be divided into the two smaller chat rooms 114, 116. As another non-limiting example, a message data traffic metric (e.g., a moving average) representative of an amount of message data traffic over a window of time may be calculated and compared to a threshold value to determine whether the chat room 108 is to be divided into the smaller chat rooms 114, 116. The message data traffic metric can be periodically re-calculated over different periods of time for different subsets of message content to provide an indication of how message data traffic is changing over time. In certain example embodiments, the chat room 108 may be divided into the smaller chat rooms 114, 116 even if a current calculated value of the message data traffic metric does not meet or exceed a threshold but is expected to. For example, historical message data traffic metrics that have been calculated may be used to extrapolate a future value of the metric. If this extrapolated future value of the metric meets or exceeds the threshold value, the chat room 108 may be divided into the smaller chat rooms 114, 116 in anticipation of the future increase in message traffic. As further non-limiting examples, the chat room 108 may be split into the smaller chat rooms 114, 116 based on a decrease in client or server-side bandwidth, based on topical relevance of electronic messages exchanged, based on a certain segment of video content being presented or expected to be presented in the future, or the like.

While only two smaller chat rooms are shown as resulting from the division of the chat room 108, it should be appreciated that additional smaller chat rooms may be formed as well. Further, it should be appreciated that, in certain example embodiments, the chat room 108 may be divided even if the group of user profiles 112 includes the same number of user profiles as the group of user profiles 110 such as, for example, if the amount of message data traffic generated by the group of user profiles 110 increases. It should further be appreciated that any group of user profiles depicted in FIGS. 1A-1B (e.g., the group of user profiles 110) may indicate all user profiles associated with a chat room (including those profile(s) that are not generating message content at any given time) or may include only those profile(s) that are actively generating message content.

Figure 1B:
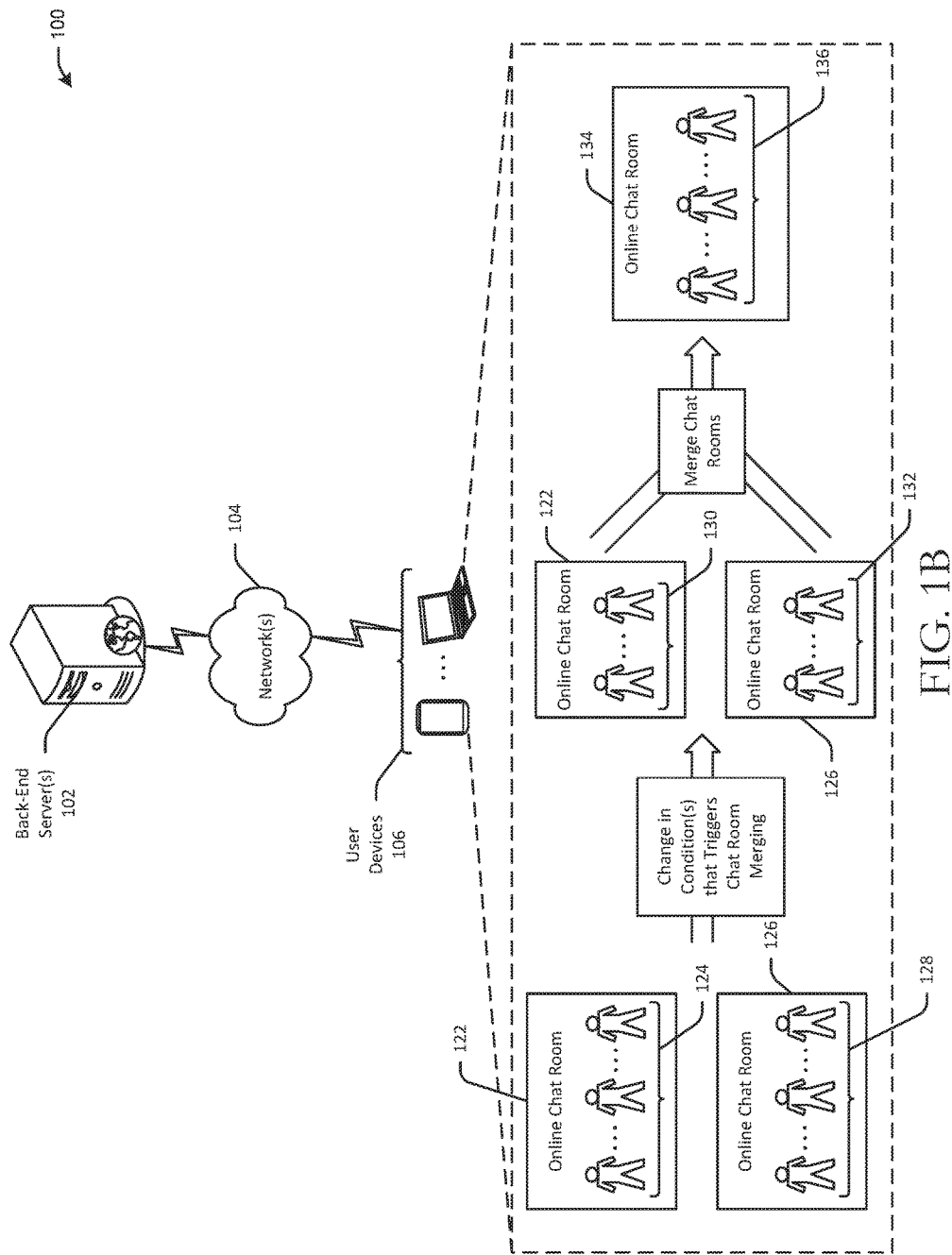
FIG. 1B depicts the merging of two or more online content sharing environments into a single merged content sharing environment in accordance with one or more example embodiments of the disclosure.

FIG. 1B depicts the merging of two or more online content sharing environments into a single merged content sharing environment in accordance with one or more example embodiments of the disclosure. The illustrative networked architecture 100 is once again depicted in FIG. 1B.

A first chat room 122 and a second chat room 126 are depicted in FIG. 1B. A first group of user profiles 124 may be associated with the first chat room 122 and a second group of user profiles 128 may be associated with the second chat room 126. The first chat room 122 and the second chat room 126 may be the same size or may be different in size. The size of a chat room may refer to a number of user profiles associated with a chat room, a number of user profiles exchanging message content at any given time, or the like. A respective amount of message data exchanged between user profiles may be determined for the chat room 122 and the chat room 126 over a first period of time. The respective amount of message data exchanged between user profiles associated with the first chat room 122 over the first period of time and/or the respective amount of message data exchanged between user profiles associated with the second chat room 126 over the first period of time may represent a decrease in message data traffic associated with the first chat room 122 and/or the second chat room 126 as compared to a prior second period of time.

A combined amount of message data being exchanged for the chat rooms 122, 126 may then be determined. If the combined amount of message data satisfies a corresponding threshold value, then the chat rooms 122, 126 may be merged into a single online chat room 134 and a respective subgroup of user profiles 130 associated with the chat room 122 and a respective subgroup of user profiles 132 associated with the chat room 126 may both be associated with the larger merged chat room 134 (depicted as group of user profiles 136). For example, if the combined amount of message data meets or falls below a threshold amount of message data traffic per unit of time, the multiple chat rooms 122, 126 may be merged into the larger single chat room 134.

In certain example embodiments, other criteria may be assessed in addition to, or as an alternative to, the amount of message data being exchanged to determine whether to merge the chat rooms 122, 126. For example, a respective number of user profiles, each of which generated at least a threshold number of electronic messages during the first period of time, may be determined for each of the chat rooms 122, 126. If the combined number of such user profiles meets or falls below a corresponding threshold value, the chat rooms 122, 126 may be merged into the single chat room 134. In other example embodiments, a respective total number of user profiles associated with each chat room 122, 126 (rather than just those user profiles exchanging messages) may be used to determine whether to merge the chat rooms 122, 126. In yet other example embodiments, a message data traffic metric representative of a combined amount of message data traffic for the chat room 122 and the chat room 126 may be calculated in connection with messages exchanged over a period of time. This metric may be compared to a threshold value to determine that the chat rooms 122, 126 should be merged into the chat room 134. In certain example embodiments, a future value of the metric may be extrapolated based on past values, and this future value may be used to determine that the chat rooms 122, 126 should be merged into the chat room 134 based on an expected decrease in combined message data traffic.

Illustrative Processes

Figure 2:
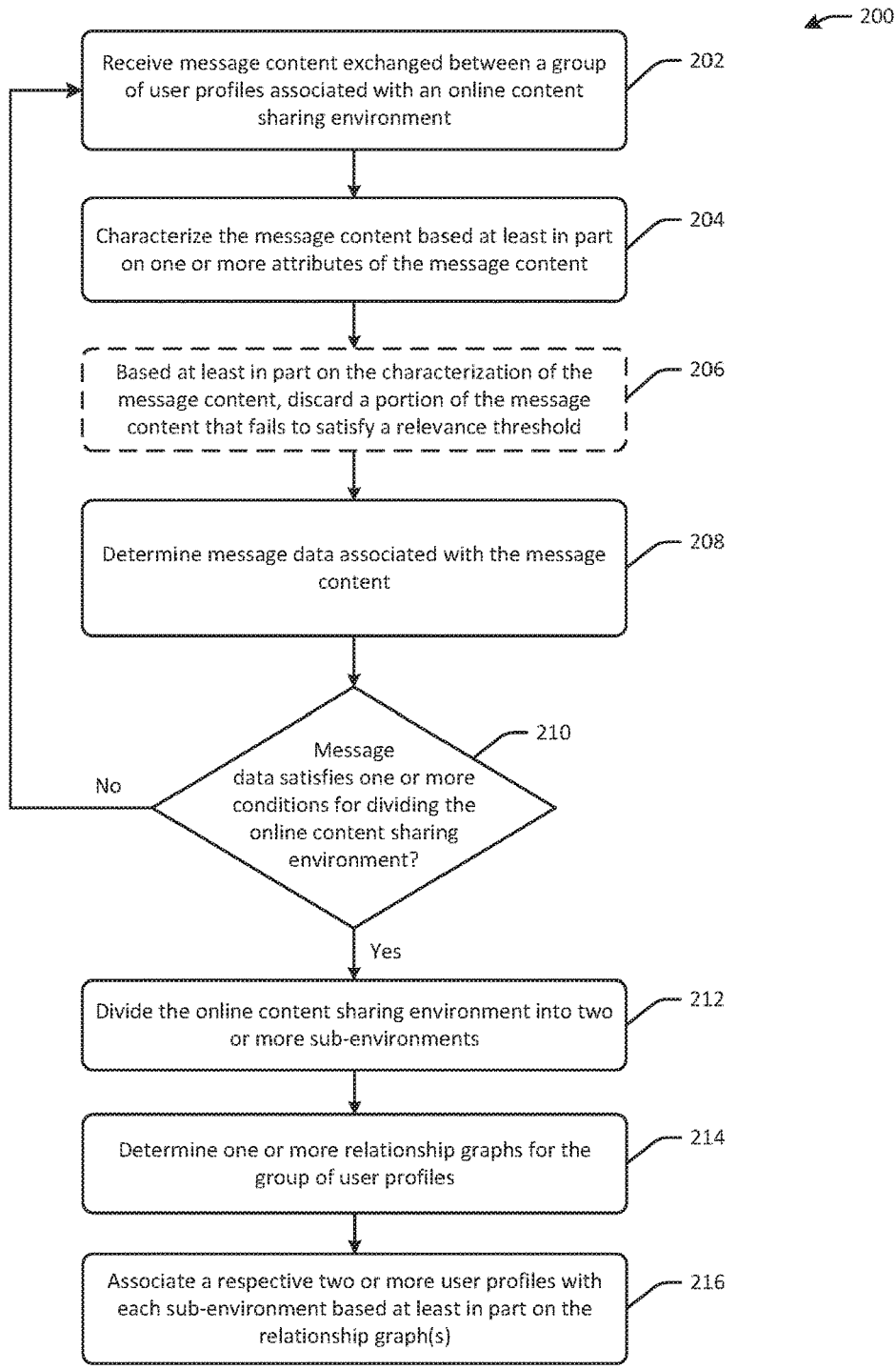
FIG. 2 depicts a process flow diagram of an illustrative method for dividing an online content sharing environment into two or more sub-environments in accordance with one or more example embodiments of the disclosure.

FIG. 2 depicts a process flow diagram of an illustrative method 200 for dividing an online content sharing environment into two or more sub-environments in accordance with one or more example embodiments of the disclosure. In certain example embodiments, one or more operations of the method 200 may be performed by the back-end server 102, or more specifically, by one or more program modules executing on the back-end server 102.

At block 202, the back-end server 102 may receive message content exchanged or to be shared among a group of user profiles associated with an online content sharing environment. For example, the back-end server 102 may receive a group of electronic text-based messages exchanged or to be shared among a group of user profiles participating in an online chat room. The message content may be received over a period of time. In certain example embodiments, the message content may be contextually related to other content (e.g., video content) being presented in the online content sharing environment.

At block 204, the back-end server 102 may characterize the message content based at least in part on one or more attributes of the message content. For example, in certain example embodiments, each distinct message contained in the message content may be assigned a relevance score indicative of a degree of contextual relevance or importance of the message to other message content generated in the online content sharing environment. Further, in certain example embodiments, natural language processing may be performed on the message content to determine which messages in the message content are contextually related to one another.

At block 206, the back-end server 102 may optionally filter the message content by discarding a portion of the message content that fails to satisfy a relevance threshold. Specifically, filtering the message content may cause one or more electronic messages to be discarded from the message content to obtain filtered message content. The message content filtering may be based on the characterization of the message content at block 204. For example, the message content received at block 202 may be filtered to prevent an electronic message that is generated by a first user profile and that is of minimal contextual relevance to other message content exchanged in the online content sharing environment from being shared with other user profiles participating in the online content sharing environment. In certain example embodiments, a first message may be contextual relevant to a second message if natural language processing determines that the first message and the second message are directed to a same conversation topic.

In certain example embodiments of the disclosure, the message content may be filtered based on the characterization of the message content and one or more filtering criteria. For example, if a message in the message content includes a word or phrase that matches a predetermined set of words or phrases flagged as inappropriate, the message may be filtered out. As another non-limiting example, semantic language processing may be performed on an electronic message in the message content (potentially with respect to one or more other electronic messages) to determine whether the message should be filtered out. For example, if the semantic language processing indicates that the message is a declarative statement that merely reinforces a statement made as part of another message, the message may be filtered out. Alternatively, if an electronic message is determined to be a question, the message may be retained. In other example embodiments, the size of an electronic message may determine whether the message is retained or filtered out. For example, if a number of characters in the message meets or exceeds a first threshold value (e.g., is too long) or meets or falls below a second threshold value (e.g., is too short), the message may be filtered out.

In still other example embodiments, a contextual relevance of a message in the message content may dictate whether the message is filtered out or retained. For example, semantic language processing may be executed to determine whether a first message in the message content is contextually relevant to one or more additional messages in the message content. If the first message is determined to be contextually relevant to a threshold number of additional messages, the first message may be retained, and if not, the first message may be filtered out. As another non-limiting example, a contextual relevance of a message may be determined with respect to video content being presented in the online content sharing environment. For example, the video content may be manually annotated to identify a set of keywords representative of items depicted in the video content, subject matter discussed in the video content, etc. Alternatively, speech recognition processing may be executed to generate a transcript of audio data associated with the video content. The set of keywords may then be identified from the transcript of the audio data. An electronic message may then be evaluated to determine whether it contains a keyword that matches a keyword in the set of predetermined keywords. If a match is detected, the message may be retained. On the other hand, if no match is detected, the message may be discarded (e.g., filtered out).

At block 208, the back-end server 102 may determine message data associated with the message content. In certain example embodiments, the message data may include a message data traffic metric indicative of an amount of message data traffic exchanged in the online content sharing environment over a period of time. The message data traffic metric may be an instantaneous value representative of an amount of message content that has been submitted to or presented in the online content sharing environment at a particular point in time. In other example embodiments, the message data traffic metric may be a moving average or other metric that is periodically calculated over time and that provides an indication of how message data traffic is changing over time.

At block 210, the back-end server 102 may determine whether the message data determined at block 208 satisfies one or more conditions for dividing the online content sharing environment into two or more sub-environments.

For example, if the message data includes a calculated message data traffic metric, the determination at block 210 may include a determination as to whether the message data traffic metric meets or exceeds a threshold value. For example, the back-end server 102 may determine whether an amount of data associated with message content filtered at block 206 meets or exceeds a threshold amount of data permitted to be exchanged in the online content sharing environment over the period of time over which the message content is received at block 202.

In response to a negative determination at block 210, the method 200 may proceed iteratively from block 202, at which point, additional message content may be received over a subsequent period of time. On the other hand, in response to a positive determination at block 210, the method 200 may proceed to block 212, where the back-end server 102 may divide the online content sharing environment into two or more sub-environments. For example, the back-end server 102 may divide an online chat room into two or more smaller chat rooms.

In other example embodiments, the determination at block 210 may include a determination as to whether the message content received at block 202 relates to a new conversation topic that was not previously discussed in the online content sharing environment. Natural language processing of the message content may be performed to make this determination. If so, a positive determination may be made at block 210. As another non-limiting example, the determination at block 210 may include a determination as to whether server and/or client-side infrastructure or bandwidth has decreased or is expected to decrease below a threshold level. If so, a positive determination may be made at block 210. As yet another non-limiting example, the determination at block 210 may include a determination as to whether a number of user profiles associated with the online content sharing environment or a number of user profiles actively exchanging message content meets or exceeds (or is expected to meet or exceed at some future point in time) a threshold number of profiles. If so, a positive determination may be made at block 210. As still another non-limiting example, the determination at block 210 may include a determination as to whether a certain type or segment of content (e.g., a certain segment of video content) is being presented or is expected to be presented in the online content sharing environment. If so, a positive determination may be made at block 210. It should be appreciated that the above examples are merely illustrative and not exhaustive.

At block 214, the back-end server 102 may determine one or more relationship graphs for the group of user profiles. The relationship graph(s) may identify which user profiles share common attributes, which user profiles exchanged contextually relevant messages, which user profiles are linked on one or more social networking platforms, and so forth. At block 216, the back-end server 102 may associate a respective two or more user profiles with each sub-environment based at least in part on the relationship graphs determined at block 214. For example, the back-end server 102 may identify subgroups of user profiles based on the relationship graphs and may associate each subgroup of user profiles with a corresponding online content sharing sub-environment. As previously noted, an association between a particular subgroup of user profiles and the original online content sharing environment (now smaller in size and from which one or more additional online content sharing environments are partitioned) may be maintained.

It should be appreciated that, in certain example embodiments, the back-end server 102 may not discard a portion of the message content that fails to satisfy a relevance threshold prior to the determination at block 210. Rather, in such example embodiments, the back-end server 102 may only filter the message content if it is determined that the amount of message content being exchanged meets or exceeds the threshold amount of message data traffic (e.g., a positive determination at block 210).

Figure 3:
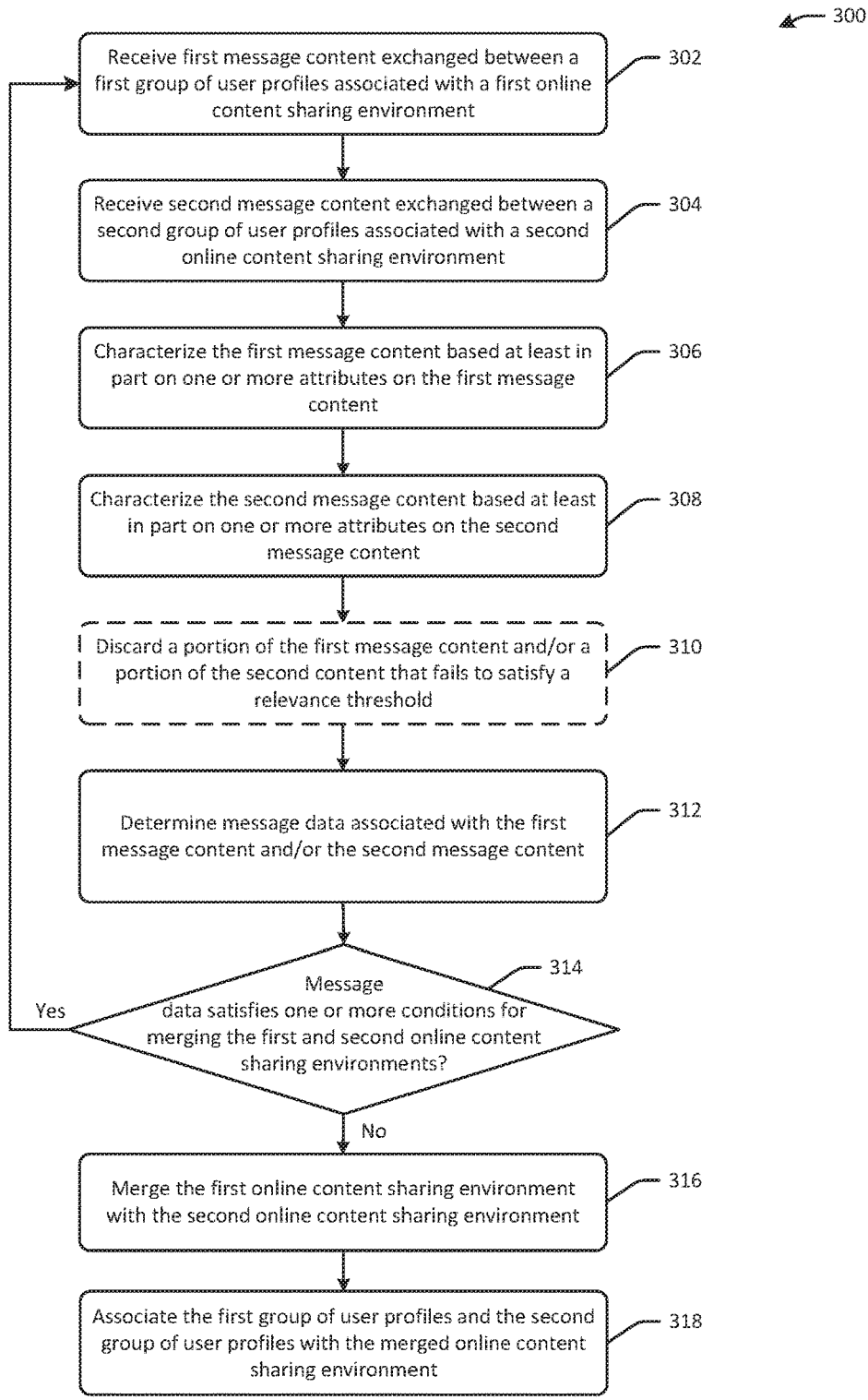
FIG. 3 depicts a process flow diagram of an illustrative method for merging two or more online content sharing environments into a single merged online content sharing environment in accordance with one or more example embodiments of the disclosure.

FIG. 3 depicts a process flow diagram of an illustrative method 300 for merging two or more online content sharing environments into a single merged online content sharing environment in accordance with one or more example embodiments of the disclosure. In certain example embodiments, one or more operations of the method 300 may be performed by the back-end server 102, or more specifically, by one or more program modules executing on the back-end server 102.

At block 302, the back-end server 102 may receive first message content exchanged or to be shared among a first group of user profiles associated with a first online content sharing environment. For example, the back-end server 102 may receive a first group of electronic text-based messages exchanged or to be shared among a first group of user profiles participating in a first online chat room. Similarly, at block 304, the back-end server 102 may receive second message content exchanged or to be shared among a second group of user profiles associated with a second online content sharing environment. For example, the back-end server 102 may receive a second group of electronic text-based messages exchanged or to be shared among a second group of user profiles participating in a second online chat room. The first message content and the second message content may be received over a same or substantially a same period of time.

At block 306, the back-end server 102 may characterize the first message content based at least in part on one or more attributes of the first message content. For example, in certain example embodiments, each distinct message contained in the first message content may be assigned a relevance score indicative of a degree of contextual relevance or importance of the message to other message content generated in the first online content sharing environment. Further, in certain example embodiments, natural language processing may be performed on the first message content to determine which messages in the first message content are contextually related to one another. Similarly, at block 308, the back-end server may characterize the second message content based at least in part on one or more attributes of the second message content.

At block 310, the back-end server 102 may discard a portion of the first message content and/or a portion of the second message content that fails to satisfy a relevance threshold. For example, the back-end server 102 may filter the first message content and/or the second message content based on the respective characterizations of the first message content and/or the second message content and based on one or more filtering criteria. Filtering the first message content may cause one or more electronic messages in a first group of electronic messages to be discarded from the first message content to obtain first filtered message content. Similarly, filtering the second message content may cause one or more electronic messages to be discarded from the second message content to obtain second filtered message content. The first message content and the second message content may be filtered based on any of the filtering criteria described with respect to operation 206 of method 200.

At block 312, the back-end server 102 may determine message data associated with the first message content and/or the second message content. For example, the back-end server 102 may determine a message data traffic metric indicative of a combined amount of message data traffic in the first and second online content sharing environments over a period of time. The message data traffic metric may be, for example, a moving average of message data traffic exchanged in both environments.

At block 314, the back-end server 102 may determine whether the message data satisfies one or more conditions for merging the first and second online content sharing environments. For example, the back-end server 102 may determine whether the message data traffic metric meets or exceeds a threshold value. For example, the back-end server 102 may determine whether filtered message content (the combination of the first filtered message content and the second filtered message content) meets or exceeds a threshold amount of message data traffic. More specifically, the back-end server 102 may determine whether an amount of data associated with the filtered message content meets or exceeds a threshold amount of data permitted to be exchanged in a single online content sharing environment over a period of time corresponding to the period of time over which the first message content and the second message content are received.

In response to a positive determination at block 314, the method 300 may proceed iteratively from block 302, at which point, additional message content exchanged as part of the first online content sharing environment may be received over a subsequent period of time. On the other hand, in response to a negative determination at block 314, the method 300 may proceed to block 316, where the back-end server 102 may merge the first online content sharing environment and the second online content sharing environment into a single merged online content sharing environment. For example, the back-end server 102 may merge two smaller chat rooms into a single larger chat room. Finally, at block 318, the back-end server 102 may associate both the first group of user profiles and the second group of user profiles with the merged online content sharing environment.

It should be appreciated that any of the other types of conditions discussed with respect to the dividing of an online content sharing environment in reference to FIG. 2 may be evaluated to determine whether to merge online content sharing environments. It should further be appreciated that, in certain example embodiments, the back-end server 102 may not filter the first message content and/or the second message content prior to the determination at block 314. Rather, in such example embodiments, the back-end server 102 may only filter the message content if it is determined that the total amount of message content being exchanged in both the first online content sharing environment and the second online content sharing environment meets or exceeds the threshold amount of message data traffic (e.g., a positive determination at block 314).

Figure 4:
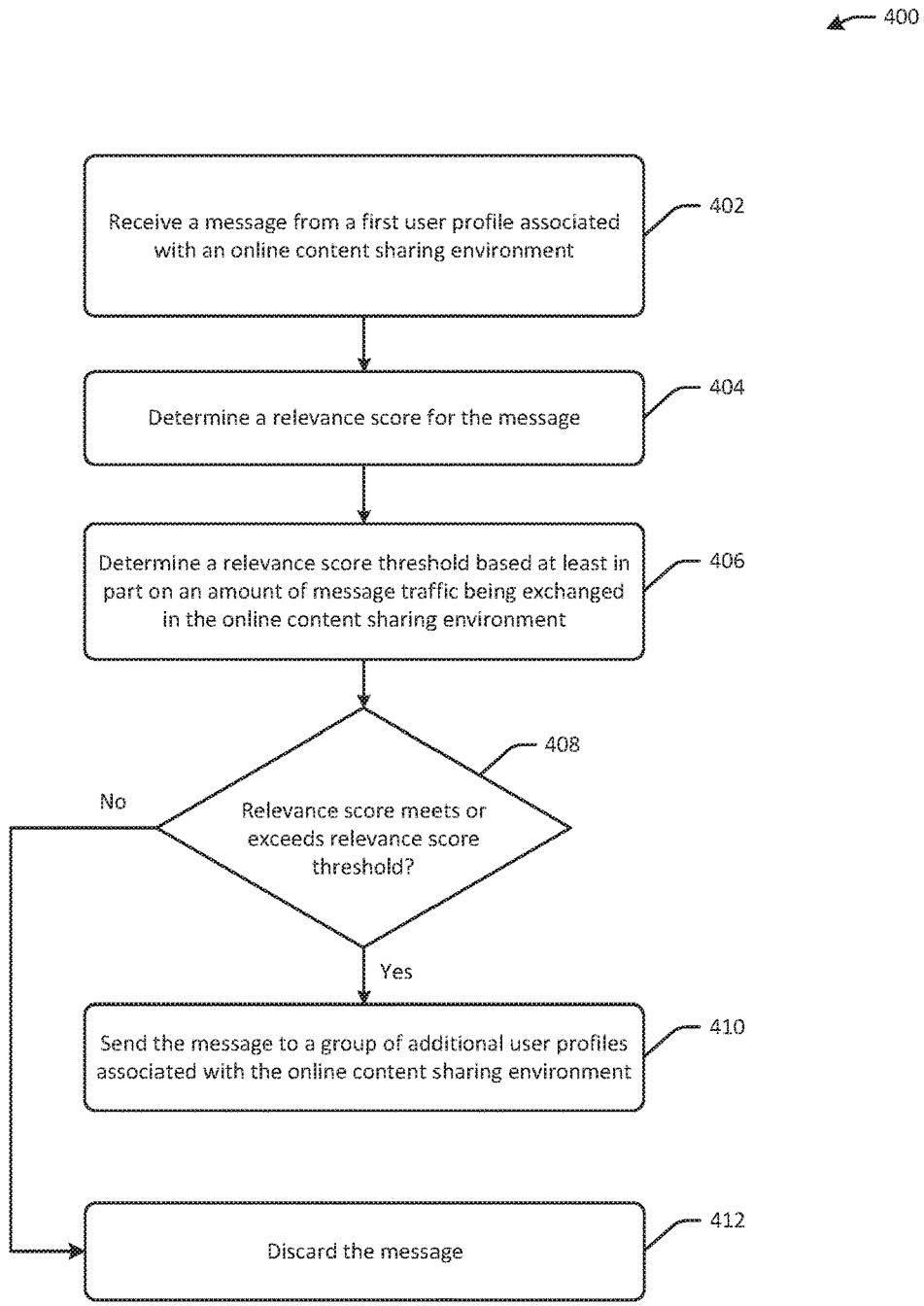
FIG. 4 depicts a process flow diagram of an illustrative method for determining one or more attributes of an electronic message and determining whether to retain or discard the message based on the attribute(s) in accordance with one or more example embodiments of the disclosure.

FIG. 4 depicts a process flow diagram of an illustrative method 400 for characterizing and discarding message content in accordance with one or more example embodiments of the disclosure. In certain example embodiments, one or more operations of the method 400 may be performed by the back-end server 102, or more specifically, by one or more program modules executing on the back-end server 102.

At block 402, the back-end server 102 may receive a message generated by a first user profile associated with an online content sharing environment. At block 404, the back-end server 102 may determine a relevance score for the message. The relevance score may be a metric that indicates a degree of relevance of the message content to one or more other messages exchanged as part of the online content sharing environment, a degree of relevance of the message to video content being presented in the online content sharing environment, or the like.

At block 406, the back-end server 102 may determine a relevance score threshold based at least in part on an amount of message data traffic being exchanged in the online content sharing environment over some period of time. The relevance score threshold and the amount of message data traffic being exchanged may be correlated with one another. For example, as the amount of message data traffic being exchanged increases, the relevance score threshold may linearly or multiplicatively increase so that a greater number of messages are filtered out, thereby tending to cause the amount of message data traffic to decrease. Conversely, as the amount of message data traffic exchanged decreases, the relevance score threshold may decrease to permit a greater number of messages to be exchanged in content sharing environment.

At block 408, the back-end server 102 may determine whether the relevance score meets or exceeds the relevance score threshold. In response to a positive determination at block 408, the back-end server 102 may send the message (e.g., make content of the message available) to a group of additional user profiles associated with the online content sharing environment, at block 410. On the other hand, in response to a negative determination at block 408, the back-end server 102 may filter out (e.g., discard) the message, at block 412.

Illustrative Networked Architecture

Figure 5:
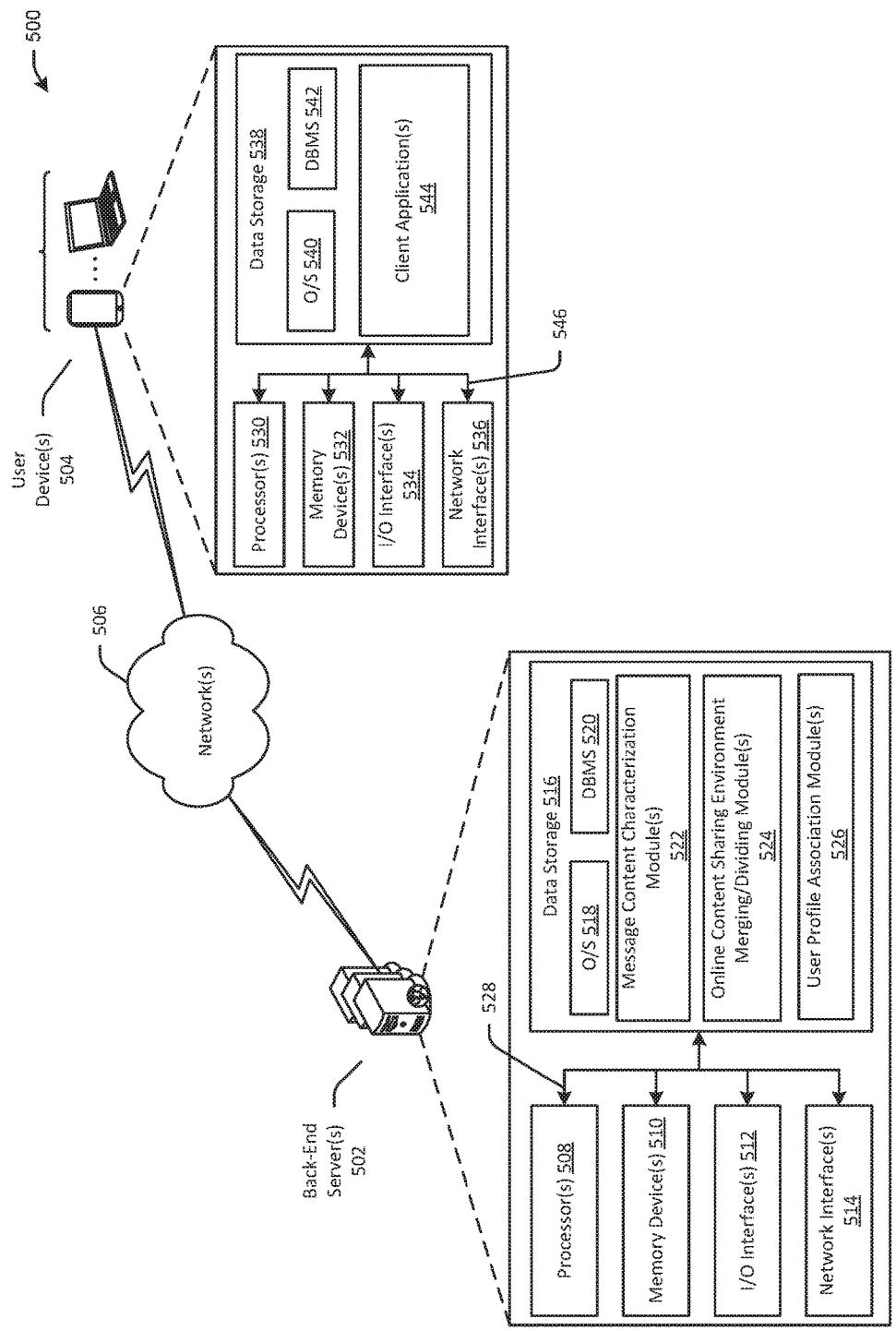
FIG. 5 is a schematic diagram of an illustrative networked architecture in accordance with one or more example embodiments of the disclosure.

FIG. 5 is a schematic diagram of an illustrative networked architecture 500 in accordance with one or more example embodiments of the disclosure. The networked architecture 500 may include one or more back-end servers 502, one or more user devices 504, and one or more datastores 540. One or more users (not shown) may interact with the user device(s) 504. While the back-end server(s) 502 and/or the user device(s) 504 may be referred to herein in the singular, it should be appreciated that multiple ones of any of the illustrative components of the networked architecture 500 may be provided, and any processing described as being performed by a particular component of the architecture 500 may be performed in a distributed manner by multiple such components. In certain example embodiments, the back-end server 502 may correspond to an illustrative configuration of the back-end server 102. Similarly, the user device 504 may correspond to an illustrative configuration of the user device 106. The back-end server 502 and the user device 504 may be configured to communicate via one or more networks 506. In addition, a first user device 504 may be configured to communicate with a second user device 504 via the network(s) 506 (and potentially via the back-end server 502). The network(s) 506 may include, but are not limited to, any of the network(s) 104.

In an illustrative configuration, the back-end server 502 may include one or more processors (processor(s)) 508, one or more memory devices 510 (generically referred to herein as memory 510), one or more input/output ("I/O") interface(s) 512, one or more network interfaces 514, and data storage 516. The back-end server 502 may further include one or more buses 528 that functionally couple various components of the server 502. These various components of the server 502 will be described in more detail hereinafter.

The bus(es) 528 may include at least one of a system bus, a memory bus, an address bus, or a message bus, and may permit exchange of information (e.g., data (including computer-executable code), signaling, etc.) between various components of the server 502. The bus(es) 528 may include, without limitation, a memory bus or a memory controller, a peripheral bus, an accelerated graphics port, and so forth. The bus(es) 528 may be associated with any suitable bus architecture including, without limitation, an Industry Standard Architecture (ISA), a Micro Type Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 510 of the server 502 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 510 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 510 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 516 may include removable storage and/or non-removable storage including, but not limited to, magnetic storage, optical disk storage, and/or tape storage. The data storage 516 may provide non-volatile storage of computer-executable instructions and other data. The memory 510 and the data storage 516, removable and/or non-removable, are examples of computer-readable storage media (CRSM) as that term is used herein.

The data storage 516 may store computer-executable code, instructions, or the like that may be loadable into the memory 510 and executable by the processor(s) 508 to cause the processor(s) 508 to perform or initiate various operations. The data storage 516 may additionally store data that may be copied to memory 510 for use by the processor(s) 508 during the execution of the computer-executable instructions. Moreover, output data generated as a result of execution of the computer-executable instructions by the processor(s) 508 may be stored initially in memory 510, and may ultimately be copied to data storage 516 for non-volatile storage.

More specifically, the data storage 516 may store one or more operating systems (O/S) 518; one or more database management systems (DBMS) 520; and one or more program modules, applications, engines, or the like such as, for example, one or more message content characterization modules 522, one or more online content sharing environment merging/dividing modules 524, and one or more user profile association modules 526. The message content characterization module(s) 522 may include computer-executable code, instructions, or the like that may be loaded into the memory 510 for execution by one or more of the processor(s) 508 to cause operations to be performed for characterizing (e.g., determining a relevance score) of an electronic message based on one or more attributes of the message. The attribute(s) may include a length of the message (e.g., a number of characters in the message), a contextual relevance of the message to other message content, attributes of a user profile that generated the message, etc. The online content sharing environment merging/dividing module(s) 524 may include computer-executable code, instructions, or the like that may be loaded into the memory 510 for execution by one or more of the processor(s) 508 to cause operations to be performed for merging multiple online content sharing environments into a single larger online content sharing environment and/or dividing an online content sharing environment into multiple smaller environments. The user profile association module(s) 526 may include computer-executable code, instructions, or the like that may be loaded into the memory 510 for execution by one or more of the processor(s) 508 to cause operations to be performed for determining an online content sharing environment with which to associate a user profile. This determination may be based on a contextual relevance of messages generated by a user profile to other message content, shared attributes of the user profile with other user profiles, or the like.

Although not depicted in FIG. 5, the networked architecture 500 may include one or more datastores that may be communicatively coupled to the back-end server 502 and/or the user device(s) 504 via at least one of the network(s) 506. Such datastore(s) may include, without limitation, databases (e.g., relational, object-oriented, etc.), file systems, flat files, distributed datastores in which data is stored on more than one node of a computer network, peer-to-peer network datastores, or the like. Such datastore(s) may store various types of data such as, for example, user profile data, message data, message data traffic metric data, or the like. Any data stored in such datastore(s) may be generated by the back-end server 502 and/or the user device 504. Further, any data stored in such datastore(s) may be generated by one component of the networked architecture 500, stored in the datastore(s), and retrieved from the datastore(s) by another component of the networked architecture 500.

The processor(s) 508 may be configured to access the memory 510 and execute computer-executable instructions loaded therein. For example, the processor(s) 508 may be configured to execute computer-executable instructions of the various program modules of the server 502 to cause or facilitate various operations to be performed in accordance with one or more embodiments of the disclosure. The processor(s) 508 may include any suitable processing unit capable of accepting data as input, processing the input data in accordance with stored computer-executable instructions, and generating output data. The processor(s) 508 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 508 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 508 may be capable of supporting any of a variety of instruction sets.

Referring now to other illustrative components depicted as being stored in the data storage 516, the O/S 518 may be loaded from the data storage 516 into the memory 510 and may provide an interface between other application software executing on the server 502 and hardware resources of the server 502. More specifically, the O/S 518 may include a set of computer-executable instructions for managing hardware resources of the server 502 and for providing common services to other application programs (e.g., managing memory allocation among various application programs). The O/S 518 may include any operating system now known or which may be developed in the future including, but not limited to, any server operating system, any mainframe operating system, or any other proprietary or non-proprietary operating system.

The DBMS 520 may be loaded into the memory 510 and may support functionality for accessing, retrieving, storing, and/or manipulating data stored in the memory 510 and/or data stored in the data storage 516. The DBMS 520 may use any of a variety of database models (e.g., relational model, object model, etc.) and may support any of a variety of query languages. The DBMS 520 may access data represented in one or more data schemas and stored in any suitable data repository.

Referring now to other illustrative components of the server 502, one or more input/output (I/O) interfaces 512 may be provided that may facilitate the receipt of input information by the server 502 from one or more I/O devices as well as the output of information from the server 502 to the one or more I/O devices. The I/O devices may include, for example, one or more user interface devices that facilitate interaction between a user and the server 502 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The server 502 may further include one or more network interfaces 514 via which the server 502 may communicate with any of a variety of other systems, platforms, networks, devices, and so forth. Such communication may occur via any of one or more of the network(s) 506.

The user device(s) 504 may be any suitable user device including, but not limited to, a laptop or desktop computer, a tablet device, a smartphone, a content streaming device, a wearable computing device, or the like. In an illustrative configuration, the user device 504 may include one or more processors (processor(s)) 530, one or more memory devices 532 (generically referred to herein as memory 532), one or more input/output ("I/O") interface(s) 534, one or more network interfaces 536, and data storage 538. The user device 504 may further include one or more buses 546 that functionally couple various components of the user device 504. These various components may correspond in type and/or function to correspondingly named components of the back-end server 502. The data storage 538 may have stored thereon one or more client applications 544. A client application 544 may include computer-executable instructions, code, or the like that can be loaded into the memory 532 for execution by one or more of the processor(s) 530 to cause operations to be performed for, as an example, providing one or more user interfaces for logging into and accessing an online content sharing platform that provides access to one or more online content sharing environments.

It should be appreciated that the program modules, applications, computer-executable instructions, code, or the like depicted in FIG. 5 as being stored in the data storage 516 and/or the data storage 538 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the server 502, locally on the user device 504, and/or hosted on other computing device(s) accessible via one or more of the network(s) 506, may be provided to support functionality provided by the program modules, applications, or computer-executable code depicted in FIG. 5 and/or additional or alternate functionality. Further, functionality may be modularized differently such that processing described as being supported collectively by the collection of program modules depicted in FIG. 5 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that any of the components of the networked architecture 500 may include alternate and/or additional hardware, software, or firmware components beyond those described or depicted without departing from the scope of the disclosure. More particularly, it should be appreciated that software, firmware, or hardware components depicted or described as forming part of the server 502 and/or the user device 504 are merely illustrative and that some components may not be present or additional components may be provided in various embodiments. While various illustrative program modules have been depicted and described as software modules stored in data storage 516 and/or the data storage 538, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 200-400 described earlier may be performed by one or more program modules, applications, or the like executing on the server 502 or by one or more program modules, applications, or the like executing on one or more user devices 504. It should further be appreciated that any of the operations of the methods 200-400 may be performed, at least in part, in a distributed manner by one or more servers 502 and one or more user devices 504, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods 200-400 may be performed in the context of the illustrative configuration of the server 502 and/or the illustrative configuration of the user device 504 depicted in FIG. 5, it should be appreciated that such operations may be implemented in connection with numerous other device configurations.

The operations described and depicted in the illustrative methods of FIGS. 2-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural properties and/or methodological acts, it is to be understood that the disclosure is not necessarily limited to the specific properties or acts described. Rather, the specific properties and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain properties, elements, and/or steps. Thus, such conditional language is not generally intended to imply that properties, elements, and/or steps are in any way required for one or more embodiments or that one or more embodiments necessarily include logic for deciding, with or without user input or prompting, whether these properties, elements, and/or steps are included or are to be performed in any particular embodiment.

That which is claimed is:

1. A method, comprising:
   receiving first message text data to be shared with a group of user profiles associated with a first online chat room, the first message text data representing a first message, a second message, and a third message;
   determining that the first message is contextually related to the second message by determining that the first message and the second message are directed to a same conversation topic;
   determining that the third message is contextually unrelated to the first message or the second message;
   discarding data representing the third message from the first message text data to obtain second message text data;
   determining a message text data traffic metric indicative of an amount of the second message text data to be shared with the group of user profiles over a period of time;
   determining that the message text data traffic metric exceeds a threshold amount of data to be shared with the group of user profiles;
   dividing the first online chat room into at least a second online chat room and a third online chat room;
   disassociating a first subgroup of user profiles from the first online chat room;
   allocating the first subgroup of user profiles to the second online chat room; and
   allocating a second subgroup of user profiles to the third online chat room.

2. The method of claim 1, further comprising determining a keyword associated with video content being presented within the first online chat room, wherein determining that the third message is contextually unrelated to the first message or the second message includes determining that the keyword is absent from the third message.

3. The method of claim 1, the method further comprising:
   receiving third message text data to be shared with the first subgroup of user profiles associated with the second online chat room;
   receiving fourth message text data to be shared with the second subgroup of user profiles associated with the third online chat room;
   determining that a combined amount of data that includes the third message text data and the fourth message text data does not exceed the threshold amount of data; and
   merging the second online chat room and the third online chat room into a single fourth online chat room by allocating the first subgroup of user profiles and the second subgroup of user profiles to the fourth online chat room.

4. The method of claim 1, further comprising determining the first subgroup of user profiles, wherein determining the first subgroup of user profiles includes:
   determining that a first user profile generated the first message;
   determining that a second user profile generated the second message; and
   including the first user profile and the second user profile in the first subgroup of user profiles.

5. A method, comprising:
   receiving message content shared with a group of user profiles associated with a first online content sharing environment;
   receiving message data associated with at least a portion of the message content, the message data comprising a message data traffic metric indicative of an amount of message data traffic exchanged in the first online content sharing environment over a period of time;
   determining that the message data satisfies one or more conditions for generating a second online content sharing environment;

generating the second online content sharing environment;

disassociating a subgroup of user profiles of the group of user profiles from the first online content sharing environment; and associating the subgroup of user profiles with the second online content sharing environment.

6. The method of claim 5, wherein the message content comprises a first message and a second message, the method further comprising:

generating filtered message content by determining that the first message fails to satisfy one or more filtering criteria and by discarding the first message from the message content, wherein the at least a portion of the message content corresponds to the filtered message content.

7. The method of claim 6, further comprising determining a keyword associated with video content being presented within the first online content sharing environment, wherein determining that the first message fails to satisfy the one or more filtering criteria comprises determining that the keyword is absent from the first message.

8. The method of claim 6, wherein determining that the first message fails to satisfy the one or more filtering criteria comprises:

determining a relevance score for the first message based at least in part on a contextual relevance of the first message to at least one other message in the message content;

determining a relevance score threshold based at least in part on an amount of data associated with the message content; and determining that the relevance score meets or falls below the relevance score threshold.

9. The method of claim 5, wherein the subgroup of user profiles is a first subgroup of user profiles, and wherein the message content is first message content, the method further comprising:

receiving second message content exchanged among or to be shared with the first subgroup of user profiles associated with the second online content sharing environment;

receiving third message content exchanged among or to be shared with a second subgroup of user profiles of the group of user profiles, the second subgroup of user profiles being associated with the first online content sharing environment;

determining that a combined amount of data associated with the second message content and the third message content does not exceed a threshold amount of data; and merging the first online content sharing environment and the second online content sharing environment by disassociating the first subgroup of user profiles from the second online content sharing environment and reassociating the first subgroup of user profiles with the first online content sharing environment.

10. The method of claim 5, further comprising determining the subgroup of user profiles by determining that a first message of the message content that is associated with a first user profile is contextually related to a second message of the message content that is associated with a second user profile and by determining that the first user profile and the second user profile are to be included in the subgroup of user profiles.

11. The method of claim 5, further comprising determining the subgroup of user profiles by determining that a first user profile and a second user profile share a common attribute and by determining that the first user profile and the second user profile are to be included in the subgroup of user profiles, wherein the common attribute relates to at least one of product purchase history, search history, or demographic criteria.

12. The method of claim 5, further comprising determining the subgroup of user profiles by:

determining a first subject matter category of interest to a first user profile;

determining a second subject matter category of interest to a second user profile;

determining that the first subject matter category of interest is different from the second subject matter category of interest; and determining that the first user profile and the second user profile are to be included in the subgroup of user profiles.

13. The method of claim 5, wherein determining that the message data satisfies one or more conditions for generating the second online content sharing environment comprises determining that the message data traffic metric meets or exceeds a threshold value.

14. A system, comprising:

at least one memory storing computer-executable instructions; and at least one processor communicatively coupled to the at least one memory, wherein the at least one processor is configured to access the at least one memory and execute the computer-executable instructions to:

receive message content shared with a group of user profiles associated with a first online content sharing environment;

receive message data associated with at least a portion of the message content, the message data comprising a message data traffic metric indicative of an amount of message data traffic exchanged in the first online content sharing environment over a period of time;

determine that the message data satisfies one or more conditions for generating a second online content sharing environment;

generate the second online content sharing environment;

disassociate a first subgroup of user profiles of the group of user profiles from the first online content sharing environment; and associate the first subgroup of user profiles with the second online content sharing environment.

15. The system of claim 14, wherein the message content comprises a first message and a second message, and wherein the at least one processor is further configured to execute the computer-executable instructions to:

generate filtered message content by determining that the first message fails to satisfy one or more filtering criteria and discarding the first message from the message content, wherein the at least a portion of the message content corresponds to the filtered message content.

16. The system of claim 15, wherein the at least one processor is further configured to execute the computer-executable instructions to determine a keyword associated with video content being presented within the first online content sharing environment, and wherein the at least one processor is configured to determine that the first message fails to satisfy the one or more filtering criteria by executing the computer-executable instructions to determine that the keyword is absent from the first message.

17. The system of claim 15, wherein the at least one processor is configured to determine that the first message fails to satisfy the one or more filtering criteria by executing the computer-executable instructions to:
  determine a relevance score for the first message based at least in part on a contextual relevance of the first message to one or more other messages included in the message content;
  determine a relevance score threshold based at least in part on an amount of data associated with the message content; and
  determine that the relevance score meets or falls below the relevance score threshold.

18. The system of claim 14, wherein the message content is first message content, and wherein the at least one processor is further configured to execute the computer-executable instructions to:
  receive second message content exchanged among or to be shared with the first subgroup of user profiles associated with the second online content sharing environment;
  receive third message content exchanged among or to be shared with a second subgroup of user profiles of the group of user profiles, the second subgroup of user profiles being associated with the first online content sharing environment;
  determine that a combined amount of data associated with the second message content and the third message content does not exceed a threshold amount of data; and
  merge the first online content sharing environment and the second online content sharing environment by disassociating the first subgroup of user profiles from the second online content sharing environment and reassociating the first subgroup of user profiles with the first online content sharing environment.

19. The system of claim 14, wherein the at least one processor is further configured to determine the first subgroup of user profiles by executing the computer-executable instructions to determine that a first message of the message content that is associated with a first user profile is contextually related to a second message of the message content that is associated with a second user profile and determine that the first user profile and the second user profile are to be included in the first subgroup of user profiles.

20. The system of claim 14, wherein the at least one processor is further configured to determine the first subgroup of user profiles by executing the computer-executable instructions to:
  determine a first subject matter category of interest to a first user profile;
  determine a second subject matter category of interest to a second user profile;
  determine that the first subject matter category of interest is different from the second subject matter category of interest; and
  determine that the first user profile and the second user profile are to be included in the first subgroup of user profiles.

* * * * *